United States Patent Office 3,190,236
Patented June 22, 1965

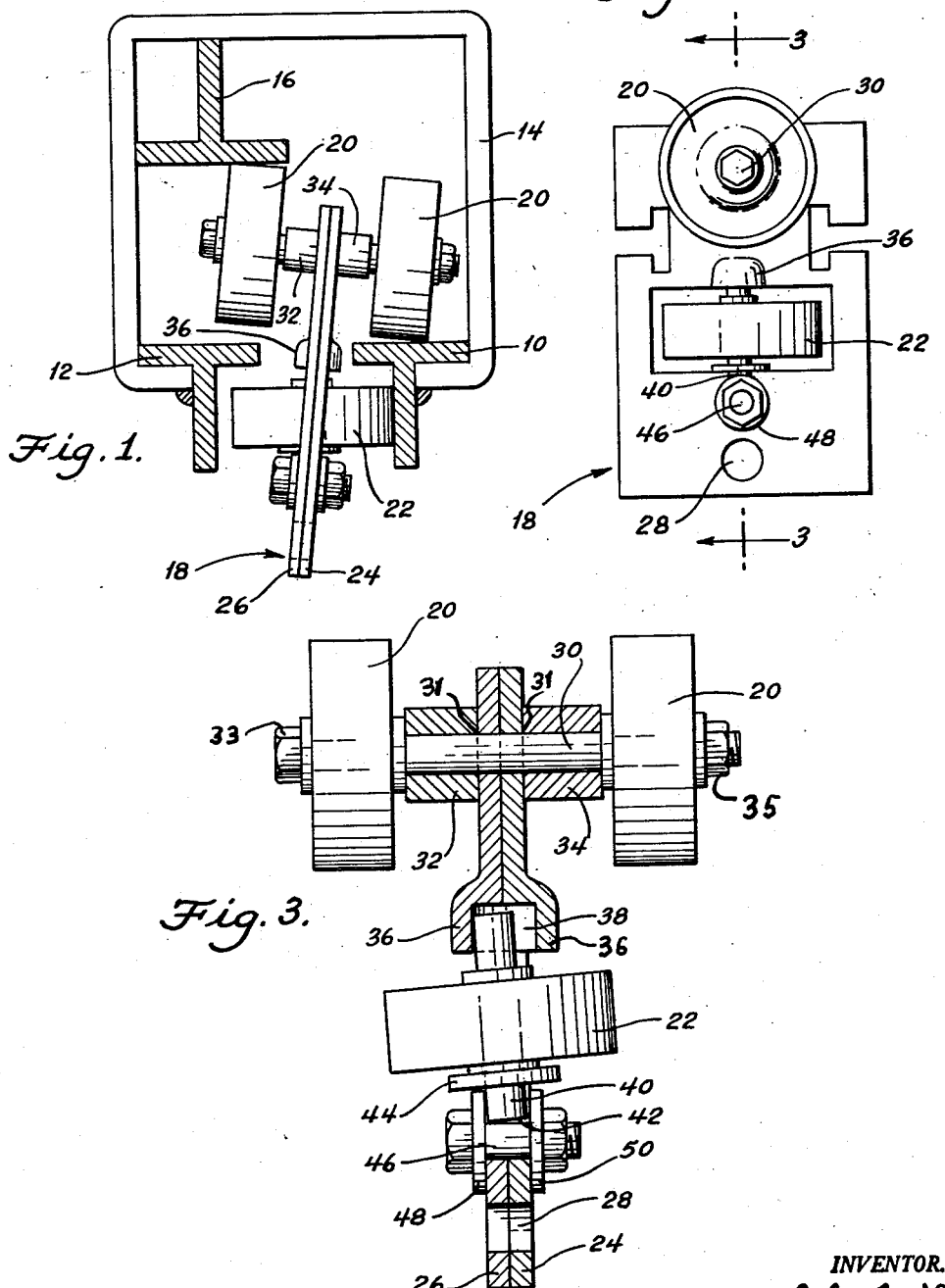

3,190,236
HOOK CONVEYORS
John M. Leach, Port Washington, N.Y.
(P.O. Box 350, Port Jefferson, N.Y.)
Filed Nov. 21, 1960, Ser. No. 70,648
4 Claims. (Cl. 105—155)

The present invention relates to conveyors. More particularly, it relates to conveyors of the trolley type wherein wheeled trolleys are connected together by suitable linkages and the trolleys support the work carried through suitable facilities such as hooks or the like.

The present invention is an improvement on the inventions shown in my prior United States Patents Nos. 2,609,082; 2,609,083; 2,808,146; and 2,884,116.

It is an object of the present invention to provide a conveyor trolley which can be quickly assembled or disassembled.

It is a further object of the present invention to provide a conveyor trolley in which the wheels are mounted so as to reduce wear on the bearings.

It is a still further object of the present invention to provide a conveyor trolley in which certain of the wheels automatically adjust the angularity of their axes to compensate for different positions of the trolley.

Other objects of the present invention will become apparent to those skilled in the art from the following detailed description of what is now considered to be the preferred form of the invention.

Reference is now made to the drawings of the invention in which like reference characters refer to like parts throughout and in which;

FIG. 1 is a cross sectional view of a horizontal track turn with a trolley of the present invention negotiating the turn;

FIG. 2 is a side view of the trolley of the present invention; and

FIG. 3 is a cross sectional view taken on the plane indicated by line 3—3 on FIG. 2 and looking in the direction of the arrows.

Referring to FIG. 1, there is shown a vertical cross section of a typical horizontal track curve used in the type of trolley conveyor to which the present invention is directed. The track consists of bars 10, 12 and 16 suitably fastened together at any desired intervals by brackets 14.

The trolley of the present invention consists of two plates 24 and 26 provided with concentric openings near the bottoms of the plates which form a hanger opening 28.

Two vertical wheels 20 are carried on a shaft 30 which is preferably in the form of a bolt having a head 33 and a nut 35. The bolt 30 passes through openings 31 in the plates 24 and 26 and through spacers 32 and 34 which serve to hold the two wheels 20 at the desired distance from the two plates. The wheels are fastened in place and the two plates 24 and 26 are held together by merely tightening the nut 35. It will be understood that the wheels 20 are provided with inner races which receive the clamping pressure and thus leave the wheels 20 free to rotate.

Each of the plates 24 and 26 is provided with a hollow protrusion 36 which between them form an elongated socket 38. A shaft 40 is positioned with its upper end free to rock at right angles to the plates 24 and 26 in the socket 38. The bottom of the shaft 40 extends into an elongated slot 42 formed in the two plates 24 and 26. A bolt 46 extends through the two plates 24 and 26 at the bottom of the slot under the shaft 40 and it carries washers 48 and 50 which prevent the bottom end of shaft 40 from moving sidewise out of the slot but enable the shaft 40 to rock to each side. The shaft 40 is thus locked in position in the socket 38 and the slot 42, both of which are formed in the plates 24 and 26. This locking is accomplished by merely tightening the nut on the bolt 46.

A third wheel 22 is carried on the shaft 40 and is held in proper vertical position by a washer 44.

It will be seen that the trolley construction just described enables the shaft 40 and the wheel 22 to undergo limited sidewise movement in each direction at the top of the shaft 40 with the bottom of the shaft 40 restrained from vertical or horizontal movement but free to permit the upper portion of the shaft 40 to rock throughout the full extent of the socket 38.

It will be understood that the trolleys of the present invention are connected together by linkages as described in the above identified patents. It will also be understood that these trolleys rock slightly, as shown in FIG. 1, when they go into a horizontal turn. When the trolley of the present invention rocks in the turn in the direction shown in FIG. 1, the wheel 22 and shaft 40 automatically rock into the position shown in FIG. 3. The major axis of the slot 38 is selected so that the shaft 40 comes to rest in an angular position such that the rim face of the wheel 22 remains in parallel contact with the side of the rail 10.

When a trolley enters a horizontal turn which causes it to rock in the opposite direction from that shown in FIG. 1, the shaft 40 and the wheel 22 will rock in the opposite direction from that shown in FIG. 1 automatically so as to maintain parallel contact between the face of the wheel 22 and the rail 12. In this manner the force exerted against the bearing of wheel 22 is always exerted at a true right angle to the bearing shaft 40 and not at an angle off of the true angle which would cause accelerated wear of the bearing. This ability of the wheel 22 to assume various angular positions to insure the application of pressure to its bearing shaft 40 at the correct angle greatly increases the bearing life of the wheel 22.

The trolley construction of the present invention makes it possible to completely assemble a trolley by fastening only two bolts 33 and 46. It also makes it possible to replace either one or both of the wheels 20 by removing only the bolt 33 or to replace the wheel 22 by removing only the bolt 46. This greatly facilitates original assembly as well as maintenance.

The foregoing description of the invention is intended to be exemplary only as many changes and modifications can be made without departing from the spirit of the invention.

The invention having been described, what is claimed is:

1. A conveyor comprising a trolley, means for applying force to the trolley at different angles, a wheel carried by the trolley, a bearing for the wheel, an angularly movable mount for the wheel bearing which will enable the wheel to assume different angular positions relative to the trolley to correct for varying angles of application of force to the bearing.

2. A conveyor trolley comprising a plate, a wheel, a bearing for the wheel, a support for the bearing comprising a shaft which passes through the bearing, means for attaching one end of the shaft to the plate with provisions for limited pivotal movement of the said end of the shaft, and means for connecting the other end of the shaft to the plate to provide for limited rocking action of the wheel and shaft.

3. A trolley comprising a pair of plates having concentric openings and shaft retaining cavities therein, a shaft extending through two of said concentric openings, wheels on said shaft, a fastener for simultaneously holding the wheels on said shaft, the shaft on said plates and said plates together, a second shaft positioned at an angle to said first shaft and seated at opposite ends within said cavities with the end nearest said first shaft loosely seated within its cavity to enable it to rock on its opposite end, a wheel on said second shaft, and fastening means for simultaneously holding the second shaft in said cavities, the wheel on said second shaft and the two plates together.

4. A conveyor trolley comprising two plates arranged vertically in side by side contacting relationship and having concentric openings extending therethrough, a bolt extending through two of said concentric openings, two wheels on said bolt, one on each side of said plates, a nut on said bolt to hold the wheels on the bolt and the plates in tight contact, a hollow protuberance extending from each plate at adjacent points to form a socket at the top edge of two other of said concentric openings, another slot shaped pair of concentric openings intersecting the last named pair of concentric openings at the lower edge, a shaft fitted into the top portion of the slotted openings, extending across said two other concentric openings and fitted into said socket, said socket being larger than the said shaft, so as to enable the upper portion of the shaft to rock at right angles to the plates, a wheel mounted on said shaft, and a bolt extending through the bottom portion of the slot shaped openings to support the bottom portion of said shaft, hold the shaft in position in the socket and also hold the plates in tight contact.

References Cited by the Examiner

UNITED STATES PATENTS

| | | | |
|---|---|---|---|
| 1,314,202 | 8/19 | Moore | 105—150 |
| 2,134,755 | 11/38 | Frank et al. | 105—155 |
| 2,249,531 | 7/41 | Landahl | 105—155 |
| 2,485,215 | 10/49 | Rose | 105—155 |
| 2,609,082 | 9/52 | Leach | 105—155 |
| 2,633,088 | 3/53 | King | 105—155 |
| 2,718,852 | 9/55 | Cacciatore | 105—153 |
| 2,892,419 | 6/59 | King | 105—155 |

EUGENE R. CAPOZIO, *Primary Examiner.*

J. S. SHANK, N. M. ELLISON, LEO QUACKENBUSH, ROBERT E. PULFREY, *Examiners.*